(12) United States Patent
Brouhon (10) Patent No.: US 7,269,531 B2
(45) Date of Patent: *Sep. 11, 2007

(54) HYBRID SENSING TECHNIQUES FOR POSITION DETERMINATION

(75) Inventor: Patrick Brouhon, Saint Martin d'Uriage (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/693,010

(22) Filed: Oct. 23, 2003

(65) Prior Publication Data

US 2004/0135776 A1 Jul. 15, 2004

(30) Foreign Application Priority Data

Oct. 24, 2002 (EP) ................................. 02354170

(51) Int. Cl.
*G01C 9/00* (2006.01)
(52) U.S. Cl. .................................................... 702/150
(58) Field of Classification Search ................ 702/150; 382/314; 356/28; 396/85; 250/231.14; 348/116; 318/580, 568.12; 178/19.03; 345/179; 400/708

See application file for complete search history.

(56) References Cited

U.S. PATENT DOCUMENTS

| | | | |
|---|---|---|---|
| 5,852,434 A | 12/1998 | Sekendur | 345/179 |
| 6,330,057 B1 | 12/2001 | Lederer et al. | 356/28 |
| 6,741,335 B2 * | 5/2004 | Kinrot et al. | 356/28 |
| 6,792,165 B1 * | 9/2004 | Silverbrook et al. | 382/314 |
| 6,841,963 B2 * | 1/2005 | Song et al. | 318/568.12 |
| 6,850,024 B2 * | 2/2005 | Peless et al. | 318/580 |
| 2001/0055063 A1 * | 12/2001 | Nagai et al. | 348/116 |
| 2004/0109034 A1 * | 6/2004 | Brouhon | 346/143 |

FOREIGN PATENT DOCUMENTS

| | | |
|---|---|---|
| EP | 0 942 285 B1 | 12/2002 |
| WO | 01/26032 A1 | 4/2001 |
| WO | 02/42989 A1 | 5/2002 |

OTHER PUBLICATIONS

Nov. 15, 2004 letter from Mr. Oral Sekendur sent to the applicant (1 page).
Nov. 19, 2004 letter from Mr. Oral Sekendur sent to the applicant (1 page).

* cited by examiner

*Primary Examiner*—Carol S. W. Tsai
*Assistant Examiner*—Xiuqin Sun (57) ABSTRACT

The invention provides for a method and apparatus for improving error-correction in non-contact optical position sensing. The primary application is in page-based data input contexts such as form-filling and paper-based web interfaces and GUIs. The invention utilises a combined measurement of the relative movement of a device in relation to a fixed surface and at least one measurement of the absolute position of the device. Absolute measurement of position is preferably carried out using a position-encoded glyph bed embedded on the fixed surface. Based on the at least single absolute measurement, the relative measurement of the devices movement, or stroke, is normalised to the properly measure absolute position and thus substantial interruptions in the detection of the absolute stroke position can be tolerated and corrected for.

24 Claims, 4 Drawing Sheets

HYBRID SENSING TECHNIQUES FOR POSITION DETERMINATION

FIELD OF THE INVENTION

The present invention relates to methods and apparatus for spatial location and translation measurement. More particularly although not exclusively, the invention relates to non-contact optical methods and apparatus for measuring the location and translation of a device in relation to a position-encoded surface. Such methods and apparatus can be used for accurately determining the position of printing, pointing or analogous devices on a writing surface or a printed page.

The invention also relates to methods and apparatus for improving the accuracy and error-tolerance of non-contact optical position measuring systems. In particular, the invention relates to improvements in the error-correction capability of position-sensing pointing, printing and digitizing devices.

BACKGROUND OF THE INVENTION

Pointing, printing, digitizing and similar devices are concerned at various levels with detecting a peripheral device in relation to a fixed reference point. The precise position sensing arrangement which is chosen depends on the particular task which the device is to achieve.

Relative motion sensing is used to control a cursor, for example, by means of a mouse incorporating a ball/sensor mechanical arrangement. This type of device detects incremental displacements transmitted to the sensors by the balls movement and thus the motion of the mouse in relation to the fixed surface can be used to control the position of an on-screen cursor. Such a technique however, does not provide absolute position information as there is no fixed reference point and each time the mouse is lifted and replaced on the mouse surface, there is no way of detecting its location.

Non-contact techniques for measuring relative displacement also exist. Optical devices using such techniques employ a CCD sensor which images a fixed, patterned surface. For example, the movement of an optical mouse is detected by imaging the movement of elements of a fixed surface pattern or texture to provide a translation vector and thus x and y cursor displacements.

These relative position measurement devices require a specific surface upon which to operate. In the former case, a rolling surface is used. In the latter, an optically patterned surface.

To extend relative position measurement techniques to arbitrary surfaces, methods have been developed which exploit the interaction between an incident and a reflected light beam which is shone onto a surface.

An example of this is U.S. Pat. No. 6,330,057 B1 to OTM Technologies Ltd. The technique provides a vector output based on heterodyne or homodyne detection of non-doppler, non-speckle image signals derived from changes in the phase and/or the amplitude of reflection from an optical surface. This technique allows any suitable optical surface to be used as the reference surface, in particular paper. It also allows the possibility of communicating translation signals to a computer system by moving a suitable object in the field of view of the stationary device such as by means of a gesture.

Absolute position measuring techniques fall into the broad category of devices which rely on a fixed "position-encoded" surface which is imaged in order to determine the absolute location of the imaging system and thus device in relation to the surface. These systems use a "glyph bed". A glyph bed is an array of visible markings which encode absolute locations on the surface. Depending on the encoding technique, a glyph can encode a position on a logical page area which is extremely large. For example, WO 0126032 A1 to Anoto A B implements a glyph array aligned on a virtual grid with the positions of glyph marks in relation to the grid representing data values. WO 0126032 A1 describes a 4-bit cyclic encoding algorithm capable of encoding an extremely large logical area. Other examples of absolute position encoding systems include U.S. Pat. No. 5,852,434 to Sekendur which describes an absolute position measuring system whereby the position location is encoded into monolithic optically readable symbols arrayed on a grid on a page.

In both cases, a pen device is used which incorporates an imaging system in addition to a writing function. WO 0126032 A1 shows an example of such a device. The pens imaging system records the data encoded in the glyph or glyph bed in the field of view of the pen as strokes or pen "clicks" are executed. The time-varying absolute pen position, or (x, y, t) data are recorded by an associated computer.

A significant problem in absolute optical position measurement systems is obscuration of the glyph bed. This can result from overprinting with infrared opaque inks, damage to the paper and other affects which damage or obscure the position encoding glyphs. Obscuration causes the pen to lose sight of the glyph bed and if error correction or interpolation is not successful, stroke capture will be incomplete and/or error-laden. This problem can, to an extent, be overcome by restricting overprinting of human-readable matter to infrared transparent inks so that the pen can see through the overprinted areas. However, this solution is not ideal as it can introduce complications in terms of ink delivery during the printing process and may limit the available colour selection and production techniques.

Effective obscuration can also occur where the glyph bed is printed at a lower than normal resolution. In such a situation it is possible that the transient error-rate of stroke detection is sufficiently high to produce positioning errors and subsequent stroke data errors.

This problem is inhibiting the progress and adoption of these technologies and a solution to this difficulty is therefore highly sought-after. The invention attempts to overcome or at least ameliorate some of the abovementioned difficulties by providing an absolute non-contact optical absolute location system which is highly error-tolerant and resistant to obscuration effects in glyph detection. The invention also provides an improved optical non-contact absolute position measurement system which is suitable for low glyph resolutions.

DISCLOSURE OF THE INVENTION

In one aspect, the invention provides for a method of determining the time-varying absolute position of device in respect to a surface, the method comprising the steps of:

measuring at least one absolute position of the device in respect to the surface;

measuring a time-varying vector representing the movement of the device in respect to the surface; and initialising the position of vector to the at least one absolute position measurement thereby measuring the absolute position of the vector and thus the time-varying absolute position of the device.

In a further aspect, the invention provides a method of determining the absolute position of a stroke made by a measurement device in respect to a surface, said surface having embedded thereon position encoding indicia, the method comprising the steps of:

detecting one or more position encoding indicia and thereby calculating at least one absolute position measurement of the device;

in conjunction with the aforementioned step, measuring the relative movement of the device in respect to the surface and thereby calculating a time-varying motion vector representing the movement of the device in respect to the surface; and calculating the absolute location of the stroke in respect to the surface on the basis of at least one measurement of the absolute position in combination with the time-varying motion vector.

Preferably, the detection of the absolute position is achieved by non-contact optical means.

Preferably, the detection of the time-varying vector is achieved by means of a non-contact relative optical measurement.

The detection of the at least one absolute position may be performed by imaging a glyph bed applied to the surface.

The glyph bed is preferably a machine-readable array of markings having absolute positions encoded therein.

The glyph bed is preferably invisible to the human eye or alternatively adapted to not substantially interfere with the appearance of the surface when viewed by the human eye.

The glyph bed may be applied using inks which are visible in the infrared part of the spectrum.

The surface may be overprinted with human-readable material in such a way as to obscure a portion of the glyph bed.

The detection of the relative position of the time-varying vector representing the movement of the device in respect to the surface is preferably measured using optical means.

Preferably the detection of the relative position of the time-varying vector representing the movement of the device in respect to the surface is preferably measured using heterodyne or homodyne detection of non-doppler, non-speckle image signals derived from changes in the phase and/or the amplitude of reflection from an optical surface.

Alternatively, the detection of the relative position of the time-varying vector representing the movement of the device in respect to the surface may be measured using a transducer-based arrangement.

In a further aspect, the invention provides a measurement device for determining the time-varying absolute position of the device in respect to a surface including:

a first measuring device arranged to determine at least one absolute position of the device in respect to the surface;

a second measuring device arranged to determine a time-varying vector representing the movement of the device in respect to the surface;

processing means adapted to initialise the position of vector to the at least one absolute position measurement and output a signal representing the absolute position of the vector and thus the time-varying absolute position of the device.

In a further aspect, the invention provides a measurement device for determining the absolute position of a stroke made by the measurement device in respect to a surface, said surface having embedded thereon position encoding indicia, the measurement device including:

a first measuring device arranged to detect one or more position encoding indicia and determine at least one absolute position measurement of the device;

in conjunction with the aforementioned step, a second measuring device arranged to measure the relative movement of the device in respect to the surface and output a time-varying motion vector representing the movement of the device in respect to the surface; and processing means adapted to calculate the absolute location of the stroke in respect to the surface on the basis of the at least one measurement of the absolute position in combination with the measurement of the time-varying motion vector.

In a preferred embodiment, the device includes a first and second optical system, the first adapted to image a glyph bed arranged to encode the absolute position onto the surface, and the second optical system adapted to determine the relative movement of the device in respect to the surface.

The first and second optical systems may be incorporated into a common optical sensing device.

The device preferably has a pen form-factor or alternatively, a mouse form-factor or other adapted to its use or application.

The device may include additional support circuitry adapted to store stroke data.

The device may include communications circuitry adapted to transmit stroke data to a control means such as a computer.

The device may operate by buffering the stroke data for user-activated upload, or communicate the stroke data in real-time, or be responsive to a users command to upload stroke data to a control means.

In a further embodiment, the method may further include the step of, where the detection of absolute stroke position is interrupted, attempting to interpolate across the interrupted area.

The method may further include the step of sanity checking interpolation and stroke reconstruction based on the statistically possible locations of strokes applied to the surface.

The method may also include the step of general sanity checking absolute position measurements in respect of the sequence of stroke detection events of a surface by reference to user ergonomics, physical size of the surface, type of stroke applied or the speed of application of the stroke.

The method may include the step of providing feedback to a user as to whether the stroke detection is successful or not, preferably in real time.

The method may be adapted to detect the absolute position of a plurality of strokes, said strokes constituting writing, wherein sanity checking of the absolute position detection is performed based on a forward looking probabilistic algorithm responsive to the physical writing environment and process.

DETAILED DESCRIPTION OF PREFERRED EMBODIMENTS OF THE INVENTION

The invention will now be described by way of example only and with reference to the drawings in which.

The following description will be provided in the context of non-contact optical absolute location measurement combined with non-contact optical relative movement measurement. Other techniques for detecting the former of these parameters are possible and include detecting conducting particles embedded in the surface or magnetic regions arranged so that a transducer detects a signal representative of its location on the surface. In terms of the latter, other devices may be used and these include mechanical transducers to sense displacement and speed of the detecting device and electromagnetic systems to measure movement of the device over the surface.

The optical solution represents a preferred embodiment as this arrangement does not require mechanical transducer components and a significant degree of compactness and lightness is advantageous in a pen form-factor.

Figure 1:
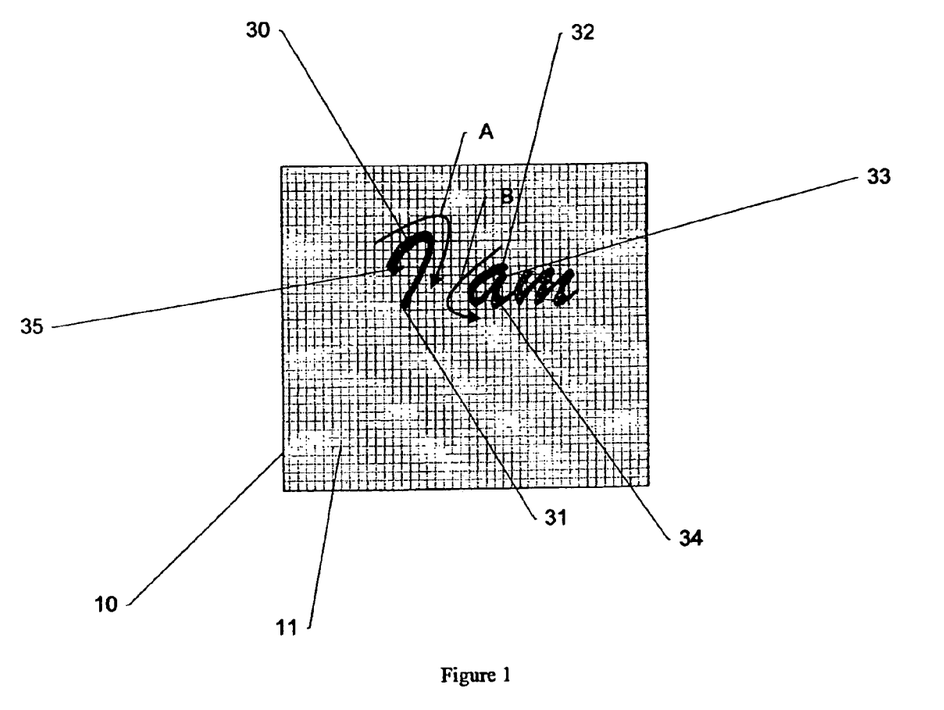
FIG. 1: illustrates details a series of strokes applied to a surface with embedded position encoding information according to an embodiment of the invention.

FIG. 1 illustrates a series of strokes 30, 33, and 34 applied to a surface. A stroke is defined as a single contiguous marking applied by a user to a surface using a pen. A stroke has a start, an end and an intermediate portion connecting the two and a stroke is broken if the pen is lifted from the surface. Thus, the element 30 in FIG. 1 corresponds to a stroke as it is formed by a single marking action with a start at 35, an end at 31 and an intermediate portion in between. The stroke in this case is formed by a user drawing in the direction indicated by A.

The stroke 30 is applied to a surface 10 which has embedded thereon a position encoded glyph bed 11. The glyph bed may be implemented in a number of ways and is therefore indicated in a schematic form as a background grid.

Figure 4:
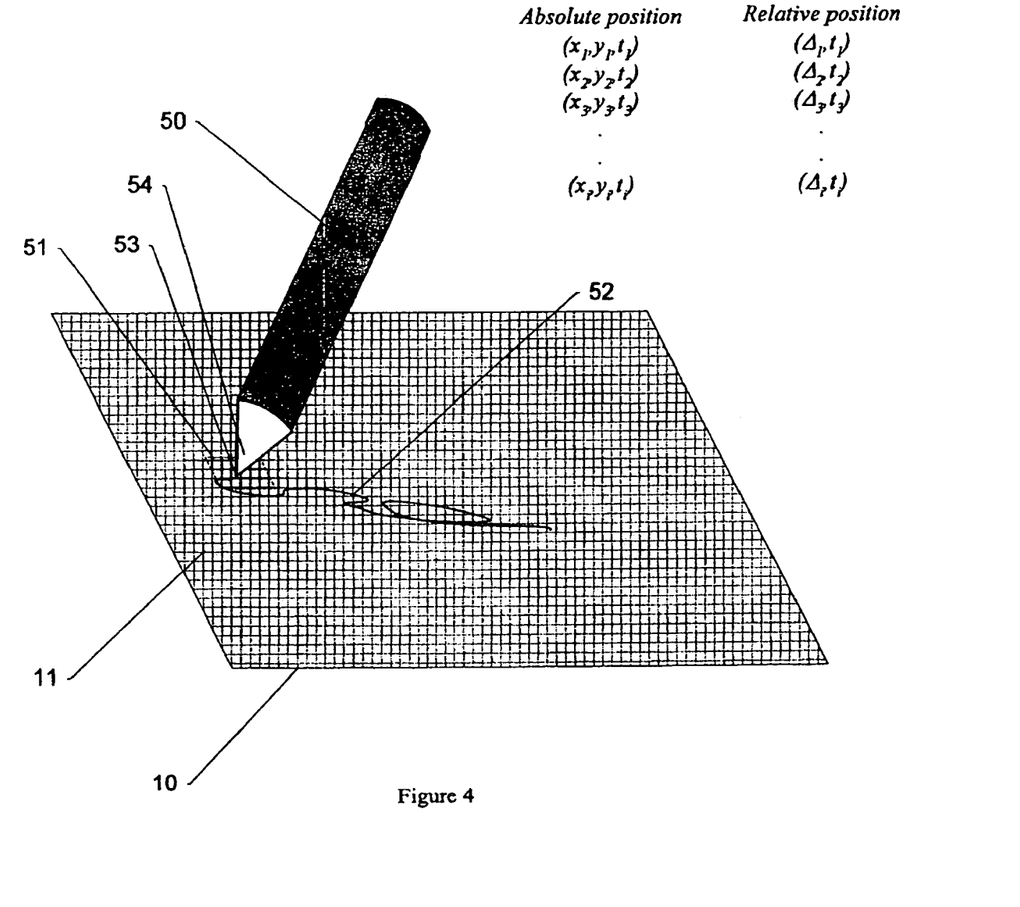
FIG. 4: illustrates a simplified schematic of a pen forming a stroke and the capturing stroke data according to an embodiment of the invention.

In a conventional optical non-contact absolute position measurement system such as that shown in FIG. 4, a user writes with a special pen 50 on a glyph embedded surface 10. The pen 50 senses contact with the writing surface and begins capturing image data. The sensing step may be done using a pressure sensor or using an analogous transducer arrangement. As the stroke is applied to the surface, the pen records a series of images of the field of view 51. This can be done using a CCD device and memory along with a microprocessor programmed suitably.

Image capture is strobed at a suitable frequency to ensure that the stroke is smoothly digitized. Each captured image 51 is processed to decode the image and extract the position information which is encoded into the glyph bed that is visible to the pen. Various corrections and calibrations to take into account pen rotation and orientation may be carried out. Details of these may be found in the documents referred to above and are not material to the present invention.

The absolute position decoding function may be performed by the pen itself, or alternatively by a control means such as a computer. It is noted that there exists various methods of handling the captured image data and decoding the position information. According to the preferred embodiment, the position data is streamed to the control means by means of a communications circuit (not shown).

Actual data transmission may be effected using a wired link such as a serial or USB connection. Alternatively, the pen may include a wireless interface such as Bluetooth or similar. As the stroke is formed and the strobed images recorded and decoded, a series of digitized absolute positions are recorded. These can be expressed as $(x_1, y_1, t_1)$, $(x_2, y_2, t_2)$, $(x_3, y_3, t_3)$ ... $(x_i, y_i, t_i)$. A complete set of data specifying the stroke is recorded and then passed to whichever application is being used to interpret the pen output.

Returning to FIG. 1, stroke 30 is digitized as a series of (x, y, t) coordinates and stored on the control means. When the pen is lifted, image recording is disabled. The next stroke begins at the point 32 and follows the direction indicated by B. Thus, for a series of strokes applied to a position-encoded surface 10, and assuming complete visibility of the background glyph bed, a complete digitized representation of the series of strokes (i.e.; a word) can be obtained.

However, in many real situations, the background glyph bed may be obscured by paper damage or, more significantly, overprinting. This situation is illustrated in FIG. 2.

Here, a form is printed on a position-encoded surface 11. The form includes infra-red (IR) opaque overprinting 18 and 21. The text "A" and "B" refer to indicia accompanying the check boxes 21. A letter "y" 13 is entered by a user into checkbox 21 and can be considered as a single stroke as it is possible to form this letter without lifting the pen. The stroke has crossed checkbox 21 at points 13 and 14 and thus the overprinting has obscured the background glyph bed. In some cases this may not be particularly problematic, as the pen may include intelligence which interpolates between highly proximate stroke stops and starts. However, for a large number of obscuration events, the overall accuracy of the stroke recording may be significantly compromised. This may be caused by repeated crossings of an overprinted area or obscuration of a significant part of a stroke.

Figure 2:
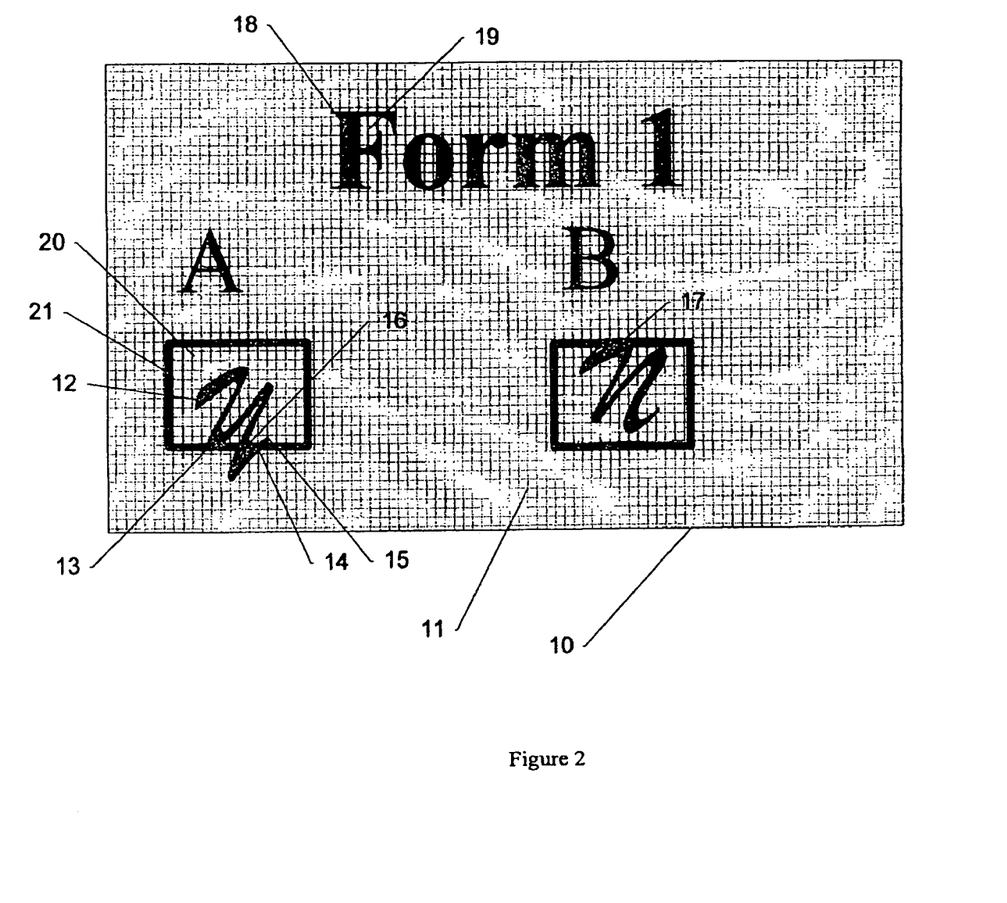
FIG. 2: illustrates an example of a stroke series applied to a mixed content surface according to an embodiment of the invention.

In FIG. 2, portions of the letters "y" and "n" would be interrupted where the pen "loses sight" of the background glyph bed as the pen crosses the overprinted areas at 13, 16 and 14 and 17.

Examples such as 17 where the pen has "grazed" the overprinted area may be particularly problematic as a significant amount of stroke data can be lost as the glyph bed remains obscured for a relatively large part of the stroke portion. Assuming no interpolation is possible between proximate stroke positions, the effect of this would be to capture stroke data that is "chopped" where the user writes on overprinted parts of the form or document.

Although a reader may be able to visually interpolate between broken representations of the strokes, if the stroke is used to produce a command output as in the case of ticking a checkbox or pen-clicking on a specified coded area, the data loss will be even more significant.

Figure 3:
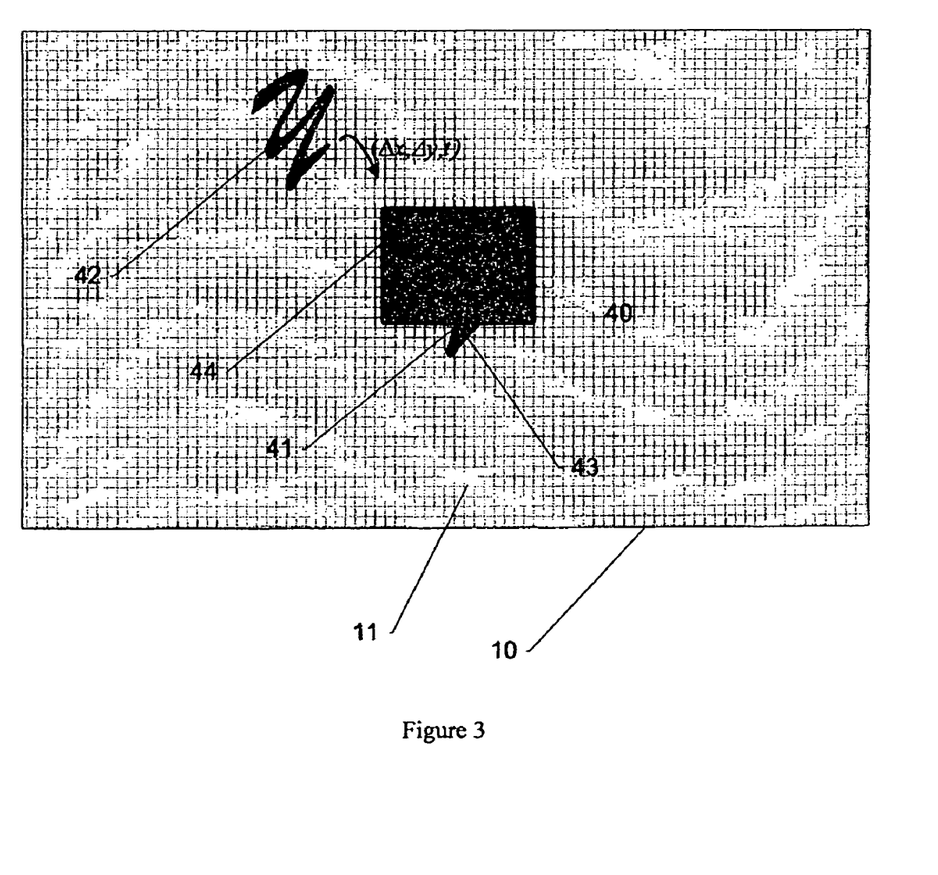
FIG. 3: illustrates normalisation of a stroke to an absolute location on an embedded position encoded surface according to an embodiment of the invention.

A more extreme case of obscuration is shown in FIG. 3. Here a block of overprinted area 44 is completely obscuring the glyph bed 11 on the surface 10 below it. If a user writes a letter "y" 40 as shown, most of the stroke data remains uncaptured as the pen remains "lost" while imaging the area of the primary part of the stroke. As the stroke leaves the overprinted block at 41, the pen regains sight of the glyph bed and absolute position data is recorded. The resulting data record corresponding to this letter obtained from optical absolute location measurement would be virtually completely corrupted.

To compensate for these effects, the embodiment of the invention described herein functions as follows. The preferred embodiment discussed here is focused on the use of non-contact optical imaging systems.

Returning to FIG. 4. a pen constructed in accordance of an embodiment of the invention captures both absolute position data as well as recording relative displacements. The relative displacements can be expressed as a series of velocity or displacement measurements $(\Delta_1, t_1)$, $(\Delta_2, t_2)$, $(\Delta_3, t_3)$ ... $(\Delta_i, t_i)$ in the sense that a series of measurements representing the velocity vector of the device are sequentially recorded. In this mode, the pen records the movement of the surface under the pen while the pen is in contact with the surface. Again this may be detected using a pressure sensor.

In this mode of operation, the pen can be thought of as completely analogous to a transducer or optical mouse. Displacements are measured relative to the starting point of the movement assuming that the device is resting on the surface or, in the case of a pen, applying a stroke to the paper surface.

There are a number of optical techniques for detecting relative movement. These include speckle velocimetry in which either a transmission pattern or a pinhole is used to modulate the speckle image. When a pinhole is used, the detected signal represents the passage of individual speckles across the pinhole and thus the displacement can be calibrated and output. In homodyne or heterodyne Doppler measurement techniques, a coherent light source is split into two beams. The primary beam illuminates the object whole velocity is to be measured. The other, reference, beam is reflected from a reference element. The reference element is usually a mirror which is part of the measurement system. The light reflected from the object and from the reference element are recombined, usually by the same beam splitter, and directed into a light-sensitive detector. The frequency of the light reflected from the object is shifted due to the doppler effect, in proportion to the object velocity component along the bisector between the primary beam and the reflected beam. Thus, if the reflected beam coincides with the primary beam, axial motion can be detected.

U.S. Pat. No. 6,330,057 describes a method whereby a surface is illuminated by a source so that the incident illumination is diffusely reflected from portions of the surface towards a detector.

The diffuse reflected light is spatially filtered so that the phase of the detected illumination from a given scatterer on the surface is constant or linearly proportional to the translation of the surface. A signal is generated by the detector responsive to the illumination incident on the detector and the relative motion of the surface in a direction parallel to the surface. The surface is illuminated through a partially reflecting object placed in adjacent to the surface where the light is transmitted to the detector by way of reflection or diffraction.

Returning to FIG. 4, when the pen is used to apply a stroke to the surface, a pressure sensor or similar triggers data capture. Simultaneously with detecting the pens absolute position the relative motion of the pen over the surface is measured. This can be expressed as a series of vectors representing the time-varying direction and velocity of the pen in relation to the surface 10. Thus the stroke in its entirety can be parameterised as a free-floating stroke element.

A stroke vector measured on this basis has no absolute position information, so it "floats" in same way that a mouse can be used to trace out a floating portion of a shape on a monitor.

This is shown in FIG. 3, whereby a stroke vector 42 for the letter "y" 40 is shown floating on the surface 11 in an arbitrary position. The relative motion measurement functions even in the presence of overprinting or other imperfections in the surface and records the shape of the pens movement. However, according to this embodiment of the invention, the pen measures this stroke vector simultaneously with at least one measurement of the absolute position. This assumes that it would be highly unlikely that a stroke would be completely confined within an overprinted area.

While this constraint may not always be satisfied, it is reasonable that it will hold for the majority of standard document formats and circumstances. If the absolute position measurement technique which was chosen did not rely on glyph visibility, this situation can be compensated for. So long as one measurement of absolute position is recorded for any single stroke, the floating relative stroke data 42 can be normalised to that position.

The stroke is translated to its true position 40 by normalizing it according to the vector as shown in FIG. 3. In a practical implementation it is necessary to detect when a stroke is being applied and use this signal as the trigger for recording the relative movement of the pen and, if not obscured, the position of the pen in relation to the glyph bed.

A sequence of strokes corresponds to a letter, word or phrase. Of course, other notations are possible such as checkbox filling annotations found in form applications. In operation, the recording of the complimentary data, the absolute and relative stroke data would provide a continuous corrected output to the controlling device or other interpreter mechanism. In situations where no absolute data is lost, the processing requirements of the pen may be dynamically adjusted to take into account varying memory requirements as well as data manipulation.

In a further embodiment, the data processing system may apply some sanity checking rules for normalising the relative stroke information. For example, when constraining a floating stroke, it is a safe assumption that the writer intended the stroke to be written somewhere on the present page. Thus the target area for normalising the stroke data is constrained according to the physical writing environment.

Another type of sanity checking is where the pen attempts to interpolate where absolute position data is lost. This may be in regions where the stroke data was interrupted suddenly with no attendant lifting of the pen from the page. Thus for small areas of data loss, for example, such as where a stroke traverses a very small overprinted region, the system may be programmed with extrapolation tolerances which will simply join the ends of the broken absolute location stroke data in such circumstances.

Other methods may include forward-looking statistical treatments to determine the location where a stroke should be normalised. This method may implement a set of rules for predicting where a floating stroke belongs based on the previous stroke positions and various assumptions about where the next stroke will be located. These parameters are necessarily flexible, but may include factors such as proximity to the edge of the page, characteristics of the users handwriting and similar issues. In cases where some form of optical character recognition is implemented, some predictive text functionality could be used to constrain the location of floating strokes in order to rebuild the written material and properly digitise its location.

There are a number of applications in which embodiments of the invention may find use. Foremost is in form-filling applications where a composite page would include a glyph bed of absolute location coded material, large amounts of overprinting including checkboxes, text boxes and guide areas for the insertion of handwritten text. Other applications include position-encoded media such as magazines, newspaper and paper-based web interface. The risk of glyph obscuration is particularly high in the case of magazines and newspapers which normally contain large areas of printed material with overprinted text. Essentially these types of media have relatively little clear area where a pen could image the absolute location glyph background.

A pen suitable for use with the invention may be constructed using presently available techniques and there exist a number of variations in the specific construction such as memory capacity, data upload and communication technique. There is also some flexibility in where the on-the-fly normalisation calculations are performed. This function may be hard-programmed into the pens microprocessor itself, or handled remotely by a controlling means. The controlling means will generally be a computer on which is running the interpretation program which provides the data input interface to the selected application. The normalisation step could equally be performed by a networked machine although this may have consequences in terms of latency.

An advantage of the invention is that the accuracy of the stroke capture is not dependant on the resolution of the glyph bed. The highest precision is usually needed when capturing handwriting. In this case, it does not usually matter exactly where the handwritten stroke starts, but it is necessary to very accurately capture the relative stroke data. The invention allows the use of a less accurate absolute position detection method when combined with an accurate relative measurement technique. This is beneficial where a lower fidelity printing system and hence lower resolution glyph bed is applied to the writing surface. Also, this feature allows fewer image captures of the absolute position data while retaining effective capture of the relative motion.

Specific embodiments of the pen may include features such as audible or sensory feedback to indicate to the user whether successful error-correction has been achieved. This is most likely to be effective as a failure warning whereby the system signals to the user when it has not sensibly interpreted a stroke.

Such variations in the implementation of the invention are understood to be within the purview of one skilled in the art and will not be discussed in detail.

The invention thus provides an accurate solution to error-correction failures in non-contact absolute position measurement systems. It is also cost-effective given that some duplication of optical and processing elements is possible when producing a suitable pen. Other form factors may be possible and the invention may be combined with other digitizing technologies and situations depending on the application and degree of error correction required.

Although the invention has been described by way of example and with reference to particular embodiments it is to be understood that modification and/or improvements may be made without departing from the scope of the appended claims.

Where in the foregoing description reference has been made to integers or elements having known equivalents, then such equivalents are herein incorporated as if individually set forth.

The invention claimed is:

1. A method of determining the time-varying absolute position of a device with respect to a surface having a position-encoded portion and an obscured portion, wherein the position-encoded portion bears accessible encoded position data and the obscured portion does not bear accessible position data, the method comprising the steps of:
   moving the device with respect to the surface;
   measuring a time-varying vector representing the relative movement of the device over the position-encoded portion and the obscured portion of said surface during motion of the device;
   measuring at least one absolute position of the device with respect to the position-encoded portion of said surface during a portion of said motion when said position-encoded portion of said surface is accessible;
   initializing the position of the vector to the at least one absolute position measurement thereby measuring the absolute position of the vector and thus the time-varying absolute position of the device; and
   recording the measured time-varying absolute position of the device for subsequent outputting to an interpreter mechanism.

2. A method as claimed in claim 1 where the detection of the absolute position is achieved by non-contact optical means.

3. A method as claimed in claim 1 wherein the detection of the time-varying vector is achieved by means of a non-contact relative optical measurement.

4. A method as claimed in claim 1 wherein the detection of the at least one absolute position is performed by imaging a glyph bed which forms the position-encoded portion and is applied to the surface.

5. A method as claimed in claim 4 wherein the glyph bed is a machine-readable array of markings having absolute positions encoded therein.

6. A method as claimed in claim 4 wherein the glyph bed is invisible to the human eye or alternatively adapted to not substantially interfere with the appearance of the surface when viewed by the human eye.

7. A method as claimed in claim 4 wherein the glyph bed is applied using ink which is visible in the infrared part of the spectrum.

8. A method as claimed in claim 4 wherein the surface is overprinted with human-readable material in such a way as to obscure a portion of the glyph bed to thereby define at least part of said obscured portion of said surface.

9. A method as claimed in claim 1 wherein the detection of the relative position of the time-varying vector representing the movement of the device with respect to the surface is preferably measured using heterodyne or homodyne detection of non-doppler, non-speckle image signals derived from changes in the phase and/or the amplitude of reflection from an optical surface.

10. A method as claimed in claim 1 wherein the detection of the relative position of the time-varying vector representing the movement of the device with respect to the surface is measured using a transducer-based arrangement.

11. A method of determining the absolute position of a stroke made by a measurement device with respect to a surface, said surface having embedded thereon position encoding indicia, the method comprising:
   moving the measurement device over the position-encoded surface, and whenever the measurement device passes over said one or more position encoding indicia, at any point of said motion, detecting one or more position encoding indicia, thereby calculating at least one absolute position measurement of the device;
   in conjunction with the aforementioned detection, measuring the relative movement of the device with respect to the position-encoded surface and thereby calculating a time-varying motion vector representing the movement of the device with respect to the surface;
   calculating the absolute location of the stroke with respect to the position-encoded surface on the basis of at least one measurement of the absolute position in combination with the time-varying motion vector; and recording the calculated time-varying absolute position of the device for subsequent outputting to an interpreter mechanism.

12. A method as claimed in claim 11 further including where the detection of absolute stroke position is interrupted, attempting to interpolate across the interrupted area.

13. A method as claimed in claim 11 further including sanity checking interpolation and stroke reconstruction based on the statistically possible locations of strokes applied to the surface.

14. A method as claimed in claim 11 further including sanity checking absolute position measurements with respect to a sequence of stroke detection events of a surface by reference to user ergonomics, physical size of the surface, type of stroke applied or the speed of application of the stroke.

15. A method as claimed in claim 11 further including providing feedback to a user as to whether the stroke detection is successful or not, preferably in real time.

16. A method as claimed in claim 11, the method adapted to detect the absolute position of a plurality of strokes, said strokes constituting writing, wherein sanity checking of the absolute position detection is performed based on a forward looking probabilistic algorithm responsive to the physical writing environment and process.

17. A measurement device for determining the time-varying absolute position of the device with respect to a surface having a position-encoded portion with accessible encoded position data and an obscured portion where encoded position data is not accessible, said device including:
 a first measuring device arranged to determine at least one absolute position of the device with respect to the position-encoded portion of said surface;
 a second measuring device arranged to determine a time-varying vector representing the relative movement of the device with respect to the surface, wherein the first measuring device is further arranged to determine said at least one absolute position of the device at any time while said second measuring device is determining said time-varying vector;
 processing means adapted to initialize the position of the vector to the at least one absolute position measurement so as to produce a signal representing the absolute position of the vector and thus the time-varying absolute position of the device; and
 recording means for recording the absolute position signal for subsequent outputting to an interpreter mechanism.

18. A device as claimed in claim 17 wherein the device includes a first and second optical system, the first optical system adapted to image a glyph bed arranged to encode the absolute position onto the surface, and the second optical system adapted to determine the relative movement of the device with respect to the surface.

19. A device as claimed in claim 17 wherein the first and second measuring devices are incorporated into a common optical sensing device.

20. A device as claimed in claim 17 wherein the device has a pen form-factor or alternatively, a mouse form-factor.

21. A device as claimed in claim 17 wherein the device includes additional support circuitry adapted to store stroke data.

22. A device as claimed in claim 17 wherein the device includes communications circuitry adapted to transmit stroke data to a control means such as a computer.

23. A device as claimed in claim 17 wherein the device operates by buffering the stroke data for user-activated upload, or communicating the stroke data in real-time, or being responsive to a user's command to upload stroke data to a control means.

24. A measurement device for determining the absolute position of a stroke made by the measurement device with respect to a surface, said surface having embedded thereon position encoding indicia, the measurement device including:
 a first measuring device arranged to detect one or more position encoding indicia and determine at least one absolute position measurement of the device;
 a second measuring device arranged to measure the relative movement of the device with respect to the surface and output a time-varying motion vector representing the movement of the device with respect to the surface, wherein the first measuring device is provided for determining said at least one absolute position of the device whenever the first measuring device passes by said one or more position encoding indicia during the relative movement of the measurement device;
 processing means adapted to calculate the absolute location of the stroke with respect to the surface on the basis of the at least one measurement of the absolute position in combination with the measurement of the time-varying motion vector; and
 recording means for recording the calculated absolute position of the stroke for subsequent outputting to an interpreter mechanism.

* * * * *